Feb. 23, 1926.
D. A. MAANUM
1,573,981
DEVICE FOR REMOVING WATER FROM CREAM
Filed July 3, 1924
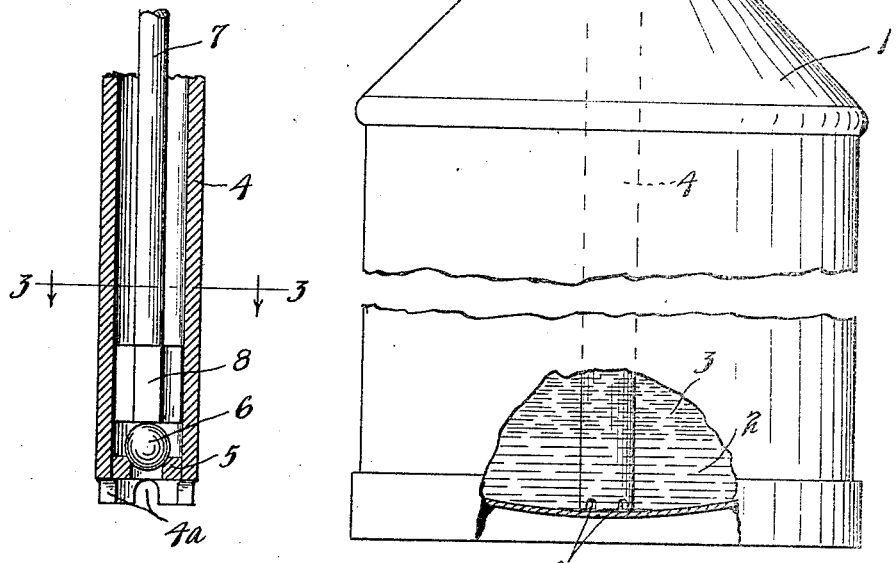

Patented Feb. 23, 1926.

1,573,981

UNITED STATES PATENT OFFICE.

DEDRICK A. MAANUM, OF MINNEAPOLIS, MINNESOTA.

DEVICE FOR REMOVING WATER FROM CREAM.

Application filed July 3, 1924. Serial No. 724,047.

*To all whom it may concern:*

Be it known that I, DEDRICK A. MAANUM, citizen of the United States, residing at Minneapolis, in the county of Hennepin and State of Minnesota, have invented certain new and useful Improvements in Devices for Removing Water from Cream; and I do hereby declare the following to be a full, clear, and exact description of the invention, such as will enable others skilled in the art to which it appertains to make and use the same.

This invention relates to a device for removing water from the bottom of a cream can.

It is now the common practice for farmers or other cream producers to separate the cream and then transport the same to the creamery or the station. For various reasons there is always a certain amount of water in the cream, and after the cream has been in the can a short time, this water settles to the bottom of the can. It is an unnecessary loss of money to transport the can to the creamery or churning station and other places with this water therein, which water is of no use and simply adds to the transportation charge. It is desirable, therefore, to remove this water from the cream as soon as the same has settled to the bottom of the can.

It is an object of this invention to provide an extremely simple and efficient device for so removing such water.

It is another object of the invention to provide such a device comprising a long stem or barrel adapted to have its end held closed and be projected down through the cream in the can to the water in the bottom thereof, through which stem or barrel the water is then pumped.

It is more specifically an object of the invention to provide such a device having a long barrel as above set forth with a pump at the top of said barrel, a check valve being disposed at the lower end of the barrel with means for holding it in closed position and a valve equipped discharge spout being exposed at the top of the barrel.

These and other objects and advantages of the invention will be fully set forth in the following description made in connection with the accompanying drawings, in which like reference characters refer to the same parts throughout the different views, and in which—

Fig. 1 is a view in side elevation of the device showing the same disposed in a can, a portion of the device being broken away and other portions shown in vertical section; and Fig. 2 is a central vertical section through the lower portion of the device; and Fig. 3 is a horizontal section taken on line 3—3 of Fig. 2 as indicated by the arrows; Figs. 2 and 3 being shown on an enlarged scale.

Referring to the drawing, a can 1 is shown such as is now commonly used to convey milk and cream. A body of water 2 is indicated in the bottom of the can, above which is the cream 3. The device or invention comprises an elongated hollow stem or barrel 4 having lateral openings or notches $4^a$ in its lower end. Adjacent said openings is a valve seat 5, with which a check valve is adapted to cooperate such as a ball 6. The plunger rod 7 is provided having a spider shaped head 8 at its lower end adapted to contact the ball 6 and hold the same against its seat 5. The cylinder 9 is connected to the upper end of barrel 4 by threaded connection as illustrated, which cylinder is of larger diameter than barrel 4 and has a closing cap 10 at its upper end held in place in said cylinder by suitable headed screws passing laterally through cylinder 9 thereto. The plunger rod 7 extends upwardly through the cap stem and at its upper end is provided with a two-armed grip handle 11, said handle being held on the plunger by a nut threaded on the top of rod 7. Another handle comprising opposite curved arms 12 is secured to the top of cap 10. A plunger 14 is disposed in the cylinder 9, being formed of a circular plate at each side of which is disposed a cup of leather or some other material, and upon each of which is disposed a washer $14^b$. A short collar or sleeve 16 is secured to the rod 7 below the lower washer $14^b$ and an elongated sleeve 17 is disposed between the upper washer $14^b$ and the handle 11, said sleeve surrounding the rod 7. At the lower end of this cylinder and at the upper end of barrel 4 is a lateral discharge spout $9^a$, which, in the embodiment of the invention illustrated is shown as part of the casting of cylinder 9. Said spout is provided with a valve seat 9b with which a check valve such as a ball 18 cooperates. Said spout 9a is provided with an opening above said ball 18 enclosed by cap 19, which can be removed to give access to said ball.

In operation the plunger 7 will be moved to the bottom of barrel 4 with the head contacting ball 6 and holding the same against the seat so that the lower end of the barrel is closed. The handle 11 will then be grasped together with the handle 12, and the plunger rod 7 held down against the ball 6. The barrel 4 is then pushed straight downward in the can through the cream so that the bottom thereof reaches the water 2 in the bottom of the can. The handle 12 is now released and rod 7 and sleeve 17 reciprocated by means of handle 11. Plunger 14 is thus reciprocated and pumping action exerted in the cylinder 9 and barrel 4. Water is thus pumped up and discharged through the valve 18 and spout 9a. The pumping action is continued until it is seen that some milk or cream is being discharged. It is then known that substantially all the water has been removed from the can. The plunger rod 7 can then again be moved downward to hold the valve 6 closed, and the device removed. Any water which is in the barrel 4 can thus be lifted out with the device.

From the above description is seen that applicant has provided a very simple and efficient device for the purpose intended. It is very desirable to remove the water from the bottom of the can for this has been a very difficult operation when an ordinary closed bottom can has been used. With applicant's device the operation can easily and quickly be performed. The device is extremely simple, easily and inexpensively made. The same has been amply demonstrated in actual practice and found to be very successful and efficient.

It will, of course, be understood that various changes will be made in the form, details, arrangement and proportions of the parts, without departing from the scope of applicant's invention, which, generally stated, consists of a device capable of carrying out the objects above set forth, such as shown and described and defined in the appended claims.

What is claimed is:

1. A device for removing water from the bottom of a cream can, comprising hollow means adapted to be projected through said cream to the bottom of the can, means adjacent the lower end of said hollow means for closing the same during said projection and means above said hollow means for raising and discharging the water through said means at a point above the can.

2. A device of the class described comprising an elongated hollow barrel of comparatively small diameter, a valve seat at the bottom thereof, an upwardly opening check valve adapted to cooperate with said seat, a plunger rod extending through said barrel and adapted to contact said valve to hold the same against said seat, a cylinder at the top of said barrel having a closed upper end, through which said plunger rod extends, a plunger in said cylinder secured to said rod, a handle secured to the top of said plunger rod, a handle secured to the top of said cylinder and a laterally extending valve equipped spout at the top of said barrel.

3. A device for removing water from the bottom of a cream can, comprising an elongated hollow barrel of comparatively small diameter, means comprising a check valve at the lower end of said barrel for closing the lower end thereof, a pump in the upper end of said barrel, a lateral valve equipped discharge conduit adjacent to upper end of said barrel and below said pump and a means for holding said check valve closed and for operating said pump.

4. A device for removing water from the bottom of a cream can, having in combination an elongated hollow barrel of comparatively small diameter, having laterally extending openings at its lower end, a valve seat adjacent said openings, a check valve cooperating with said seat, a cylinder at the upper end of said barrel, plunger rod extending through said barrel and cylinder and having a head with passages therethrough at its lower end adapted to contact said check valve, a plunger secured to said rod and said cylinder, a laterally extending discharge spout projecting from said cylinder at the top of said barrel, said spout having an outwardly opening check valve therein, a handle at the top of said cylinder and a handle at the top of said plunger rod, said handles being adapted to be grasped to hold said plunger rod with its head in contact with said first mentioned check valve.

5. A device for removing water from the bottom of a cream can, comprising hollow means of comparatively small cross-sectional area adapted to be projected through said cream to the bottom of said can, means above said hollow means for raising water through said hollow means, a discharge means above said hollow means and below said means for raising water, through which the water from said hollow means is discharged, and means adjacent the bottom of said hollow means for closing the same while it is projected into a can of cream.

In testimony whereof, I affix my signature.

DEDRICK A. MAANUM.